US012555605B2

(12) United States Patent
Guo et al.

(10) Patent No.: US 12,555,605 B2
(45) Date of Patent: Feb. 17, 2026

(54) DUAL CHANNEL BURST GAIN SWITCHING IN A DATA STORAGE DEVICE

(71) Applicant: Western Digital Technologies, Inc., San Jose, CA (US)

(72) Inventors: Guoxiao Guo, Irvine, CA (US); Gary Herbst, San Jose, CA (US); Byung Kim, Gilroy, CA (US); Tianyu Jiang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/797,467

(22) Filed: Aug. 7, 2024

(65) Prior Publication Data

US 2026/0045276 A1    Feb. 12, 2026

(51) Int. Cl.
*G11B 5/596*    (2006.01)
*G11B 5/027*    (2006.01)
*G11B 19/04*    (2006.01)

(52) U.S. Cl.
CPC ............ *G11B 19/045* (2013.01); *G11B 5/027* (2013.01); *G11B 5/59688* (2013.01)

(58) Field of Classification Search
CPC ............ G11B 5/59633; G11B 5/59661; G11B 5/59688; G11B 5/54; G11B 20/10; G11B 5/09; G11B 5/00
USPC ............................................ 360/77.12, 77.06
See application file for complete search history.

(56) References Cited

U.S. PATENT DOCUMENTS

| | | | |
|---|---|---|---|
| 6,157,510 A * | 12/2000 | Schreck | ................... G11B 5/09 |
| 7,710,676 B1 | 5/2010 | Chue | |
| 7,898,762 B1 | 3/2011 | Guo | |
| 8,693,123 B1 | 4/2014 | Guo | |
| 8,824,081 B1 | 9/2014 | Guo | |
| 8,917,469 B1 | 12/2014 | Guo | |
| 8,970,982 B1 | 3/2015 | Zhou | |
| 9,013,824 B1 | 4/2015 | Guo | |
| 9,286,926 B1 | 3/2016 | Dhanda et al. | |
| 9,704,522 B2 | 7/2017 | Yuan | |
| 10,109,301 B1 | 10/2018 | French, Jr. | |

(Continued)

OTHER PUBLICATIONS

Xiong et al., Position Error Signal Generation in Hard Disk Drives Based on a Field Programmable Gate Array (FPGA), Microsyst Technol, vol. 19, pp. 1307-1311, (2013).

*Primary Examiner* — Nabil Z Hindi
(74) *Attorney, Agent, or Firm* — Patent Law Works LLP

(57) ABSTRACT

Example control circuitry, data storage devices, and methods to use dual servo channels for burst gain switching are described. The data storage device may include two servo channels, such as the dual channels in a two-dimensional magnetic recording channel, that receive read signals for the same servo sector in parallel. One channel is calibrated to use a gain value for a first portion of the servo pattern, such as the preamble and Gray code for the servo address mark, and the other channel is calibrated to use a different gain value for a second portion of the servo pattern, such as the burst pattern. The resulting signal values may then be combined to determine the position error signal. Both channels may be configured to use different gain values for different portions of the read signal with corresponding gain switching and combining them may use the most reliable portions of each signal.

20 Claims, 9 Drawing Sheets

(56) References Cited

U.S. PATENT DOCUMENTS

| | | |
|---|---|---|
| 10,332,557 B1 | 6/2019 | Mendonsa |
| 2017/0186454 A1 | 6/2017 | Asakura |

\* cited by examiner

DUAL CHANNEL BURST GAIN SWITCHING IN A DATA STORAGE DEVICE

TECHNICAL FIELD

The present disclosure relates to servo control for data storage devices. In particular, the present disclosure relates to burst gain switching to use different analog-to-digital converter (ADC) gain values for different portions of a servo pattern.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address) which is read by the head and processed by a servo control system to control the actuator arm as it seeks from track to track. The magnetic disk acts as a non-volatile storage medium for storing data.

Some data storage device may include multiple read elements in each head to support two-dimensional magnetic recording (TDMR). These devices may additionally include a TDMR channel comprising two read channels configured for parallel operation. By combining read signals simultaneously from multiple read elements, recovery of data tracks may be enhanced as areal density on the disks increased. TDMR technology may be used in conjunction with other technologies, such as heat-assisted magnetic recording (HAMR) and thermal fly height control (TFC). In some configurations, technologies such as HAMR and TFC may result in variations in the head-disk interface that change read signal amplitudes and these changes may make servo gain setting in the channel analog-to-digital converter (ADC) more difficult as differences in amplitude across the servo pattern in each sector increase. For example, the amplitude of the preamble, synchronization mark, and servo address may vary significantly from the amplitude of the burst patterns used for fine position control. If the gain is too low, the ADC may become saturated and unresponsive to high amplitude signals. If the gain is too high, the ADC may not operate at full resolution of the ADC range, resulting in additional noise in the resulting samples. While burst gain switching has been applied in prior read channels, the settle time for changing the gain may result in erroneous samples during the settle time, undermining the accuracy of some portion of the servo sector.

FIG. 1 shows a prior art disk format 2 comprising a number of servo tracks 4 defined by a number of servo sectors 60-6N recorded around the circumference of each servo track. Data tracks may be defined relative to the servo tracks, but may not map to them on a 1:1 ratio. Each servo sector 6 includes a servo pattern recorded to the storage medium and may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address or identifier, used to position the head over a target servo/data track during a seek operation. In some configurations, this track identifier may be encoded in a servo address mark, such as a Gray code that can be used as an index to determine the track identifier. Each servo sector 6; may further comprise groups of servo bursts 14 (e.g., N and Q bursts), which comprise a number of consecutive transitions recorded at precise intervals and offsets with respect to a data track centerline. The groups of servo bursts 14 provide fine head position information used for centerline tracking while accessing a data track during write/read operations. Other configurations may use servo burst patterns with other configurations, such as A, B, C, D servo bursts. A position error signal (PES) is generated by reading servo bursts 14, wherein the PES represents a measured position of the head relative to a centerline of the target servo track. A servo controller processes the PES to generate a control signal applied to one or more head actuators (e.g., voice coil motor and one or more actuators on the actuator arms) in order to actuate the head radially over the disk in a direction that reduces PES.

There is a need for technology that improves the gain control in the channel for managing amplitude ratios across different portions of the servo pattern in the servo sector.

SUMMARY

Various aspects for data storage devices with dual channel burst gain switching are described. More specifically, a data storage device with a TDMR channel may use one gain setting for a first portion of the servo pattern in one channel while using a second gain setting for a second portion of the servo pattern through the other channel and these parallel samples may be combined for servo control to avoid errors induced by the settle time for gain switching in each channel.

One general aspect includes a data storage device including a first servo channel circuit, a second servo channel circuit, and a servo processor circuit. The first servo channel circuit is configured to: receive a first read signal for a servo pattern from a servo sector; determine, using a first gain value configured for reading a first portion of the servo pattern, signal values for the first portion of the servo pattern. The second servo channel circuit is configured to: receive a second read signal for the servo pattern from the servo sector; determine, using a second gain value configured for reading a second portion of the servo pattern, signal values for the second portion of the servo pattern, where the first gain value and the second gain value are different. The servo processor circuit is configured to combine the signal values from the first portion and the signal values from the second portion to determine a position error signal of a head.

Implementations may include one or more of the following features. The data storage device may include: a storage medium that includes a plurality of servo sectors defining a plurality of servo tracks, where the servo sector is from the plurality of servo sectors; and the head actuated over the storage medium for reading the plurality of servo tracks, where the head may include a read element, the read element may be configured to generate an analog read signal; and the first read signal and the second read signal are based on the analog read signal. The data storage device may include at least one switch between the read element and at least one channel circuit configured to provide the analog read signal to the first servo channel circuit and the second servo channel circuit in parallel with impedance matching. The head may include a plurality of read elements; and the servo processor circuit may be further configured to select the read element from the plurality of read elements in the head. The data storage device may include: a storage medium that includes a plurality of servo sectors defining a plurality of servo tracks, where the servo sector is from the plurality of servo sectors; and the head actuated over the storage medium for reading the plurality of servo tracks, where the head may include a first read element configured to generate a first analog read signal and provide the first analog read signal to the first servo channel circuit for the first read signal, and a second read element configured to generate a second analog read signal and provide the second analog read signal to the second servo channel circuit for the second read signal. The servo processor circuit may be further configured to use a cross-track separation value to combine the signal values from the first portion and the second portion; and the cross-track separation value may be calibrated for relative positions of the first read element and the second read element. The first portion may include Gray code values corresponding to a servo address mark; and the first gain value may be calibrated to optimize Gray code detection. The second portion may include signal values for at least one fine positioning burst; and the second gain value may be calibrated to prevent saturation of the second servo channel circuit. The second servo channel circuit may be further configured to: determine, using a third gain value, signal values for a first portion of the servo sector from the second read signal; and switch from the third gain value to the second gain value responsive to a gain switch position in the second read signal. The gain switch position may be calibrated to prevent a settle time for switching to the second gain value from effecting the signal values for the second portion of the servo sector from the second read signal. The servo processor circuit may be further configured to: determine, based on an amplitude difference ratio for an operating condition, a trigger condition for using the first servo channel circuit and the second servo channel circuit in parallel for servo gain control; and selectively enable, responsive to the trigger condition being met, the first servo channel circuit and the second servo channel circuit in parallel for servo gain control.

Another general aspect includes a method that includes: receiving, by a first servo channel circuit, a first read signal for a servo pattern from a servo sector; determine, by the first servo channel circuit and using a first gain value configured for reading a first portion of the servo pattern, signal values for the first portion of the servo pattern; receiving, by a second servo channel circuit, a second read signal for the servo pattern from the servo sector; determining, by the second servo channel circuit and using a second gain value configured for reading a second portion of the servo pattern, signal values for the second portion of the servo pattern, where the first gain value and the second gain value are different; and combining the signal values from the first portion and the signal values from the second portion to determine a position error signal of a head.

Implementations may include one or more of the following features. The method may include generating, by a read element in the head, an analog read signal, where the first read signal and the second read signal are based on the analog read signal. The method may include sending the analog read signal to the first servo channel circuit and the second servo channel circuit in parallel with impedance matching. The method may include selecting, from a plurality of read elements in the head, the read element to send the analog read signal to the first servo channel circuit and the second servo channel circuit. The method may include: generating, by a first read element in the head, a first analog read signal; providing the first analog read signal to the first servo channel circuit for the first read signal; generating, by a second read element in the head, a second analog read signal; and providing the second analog read signal to the second servo channel circuit for the second read signal. The method may include using a cross-track separation value to combine the signal values from the first portion and the second portion, where the cross-track separation value is calibrated for relative positions of the first read element and the second read element. The first portion may include Gray code values corresponding to a servo address mark; and the first gain value may be calibrated to optimize Gray code detection. The second portion may include signal values for at least one fine positioning burst; and the second gain value may be calibrated to prevent saturation of the second servo channel circuit. The method may include: determining, by the second servo channel circuit and using a third gain value, signal values for a first portion of the servo sector from the second read signal; and switching, by the second servo channel circuit, from the third gain value to the second gain value responsive to a gain switch position in the second read signal, where the gain switch position is calibrated to prevent a settle time for switching to the second gain value from effecting the signal values for the second portion of the servo sector from the second read signal.

Still another general aspect includes a data storage device including a first servo channel circuit, a second servo channel circuit, and means for combining the signal values from a first portion of a servo pattern and the signal values from a second portion of the servo pattern to determine a position error signal of a head. The first servo channel circuit may include: means for receiving a first read signal for the servo pattern from a servo sector; and means for determining, using a first gain value configured for reading the first portion of the servo pattern, signal values for the first portion of the servo pattern. The second servo channel circuit may include: means for receiving a second read signal for the servo pattern from the servo sector; and means for determining, using a second gain value configured for reading the second portion of the servo pattern, signal values for the second portion of the servo pattern, where the first gain value and the second gain value are different.

The present disclosure describes various aspects of innovative technology capable of improving servo control and related capacity and/or reliability gains. The various embodiments include operations and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve servo reliability and data storage device capacity, such as by using dual channels for parallel processing of servo sectors to obviate penalties from gain switching within a single channel. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Figure 1:
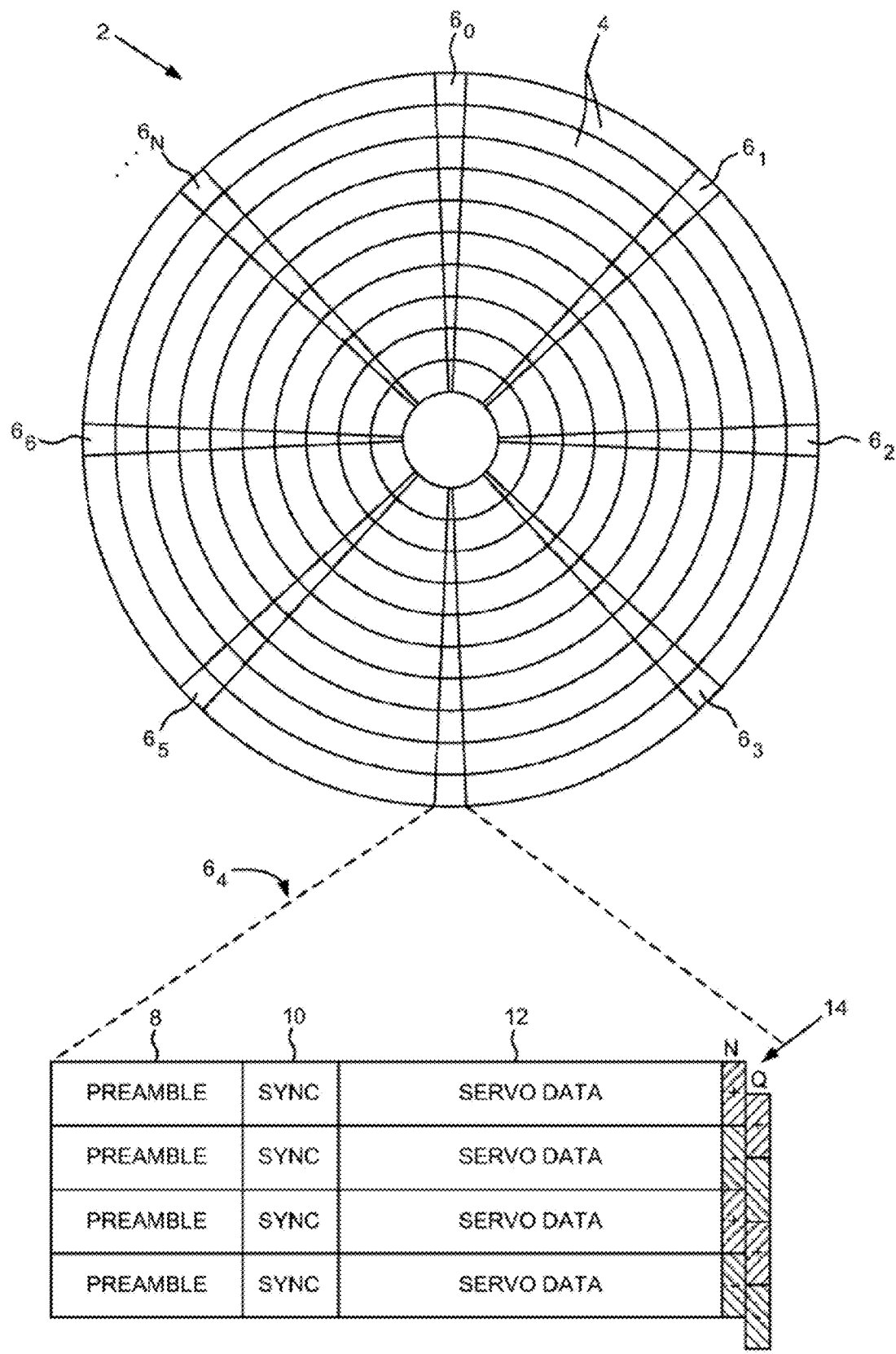
FIG. 1 is a diagram of a prior art disk format comprising a plurality of servo tracks defined by servo sectors.
Figure 2A:
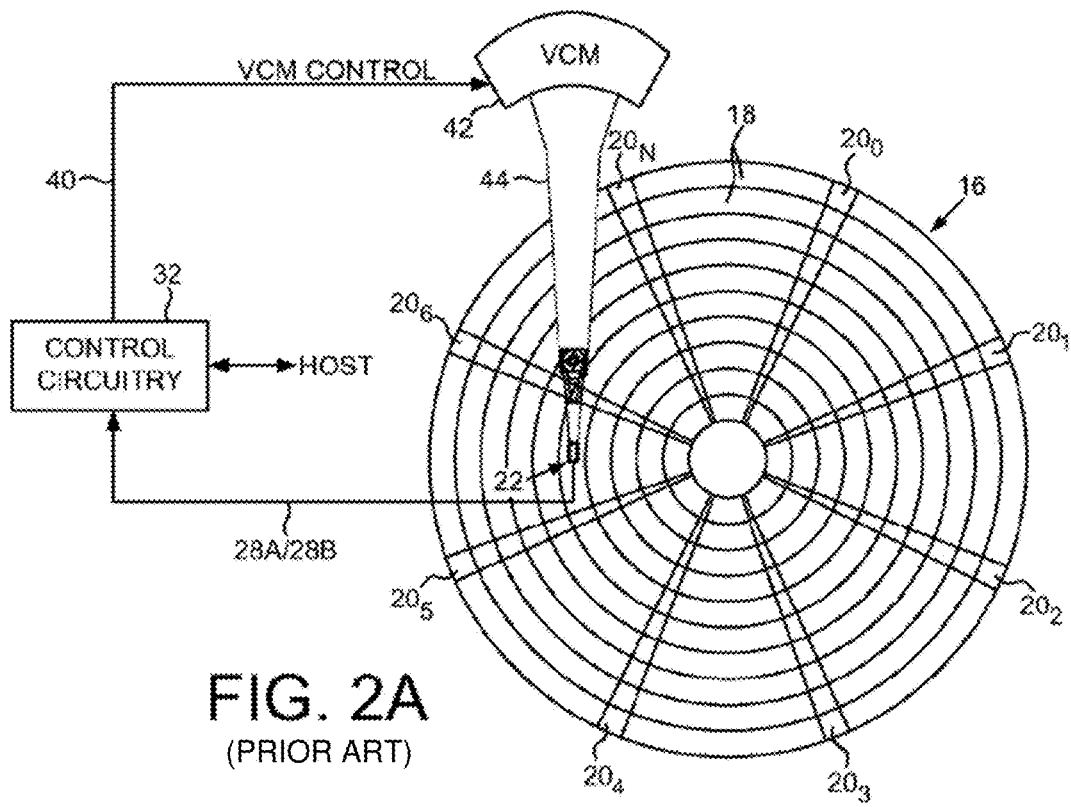
FIGS. 2A, 2B, and 2C are diagrams of a prior art data storage device in the form of a disk drive comprising a head actuated over a disk surface and using a TDMR head and channel for servo control.

FIG. 2A shows a data storage device in the form of a disk drive according to a prior art configuration comprising a disk 16 comprising a plurality of servo tracks 18 defined by servo sectors 20-20, wherein each servo sector comprises a plurality of servo bursts. The disk drive further comprises a head 22 comprising a plurality of read sensors including a first read sensor 24A, and a second read sensor 24B separated from the first read sensor 24A by a cross-track spacing (e.g., FIG. 2B). FIG. 2C shows a prior art configuration where the disk drive comprises a first servo channel 26A configured to process a first read signal 28A emanating from first read sensor 24A to generate a first position signal 30A based on at least two servo bursts read using first read sensor 24A, and a second servo channel 26B configured to process a second read signal 28B emanating from second read sensor 24B to generate a second position signal 30B based on at least two servo bursts read using second read sensor 24B. The disk drive further comprises control circuitry 32 configured to generate a position error signal (PES) 36 at block 34 (FIG. 2C) based on first position signal 30A and second position signal 30B, and servo head 22 over disk 16 at block 38 based on PES 36.

In the configuration of FIGS. 2A and 2C, servo control 38 processes PES 36 to generate a control signal 40 applied to a voice coil motor (VCM) 42 which rotates an actuator arm 44 about a pivot in order to actuate head 22 radially over disk 16 in a direction that reduces the PES. In another embodiment, control circuitry 32 may also generate a control signal applied to a microactuator (not shown) in order to actuate head 22 over the disk 16 in fine movements. Any suitable microactuator, including a plurality of actuators at different positions between VCM 42 and head 22, may be employed, such as one or more piezoelectric actuator. In addition, the microactuator may actuate the head 22 over the disk 16 in any suitable manner, such as by actuating a suspension relative to actuator arm 44, or actuating a slider relative to the suspension. Servo sectors 20-20 may comprise any suitable head position information, Such as a track address for coarse positioning and servo bursts for fine positioning.

Figure 2B:
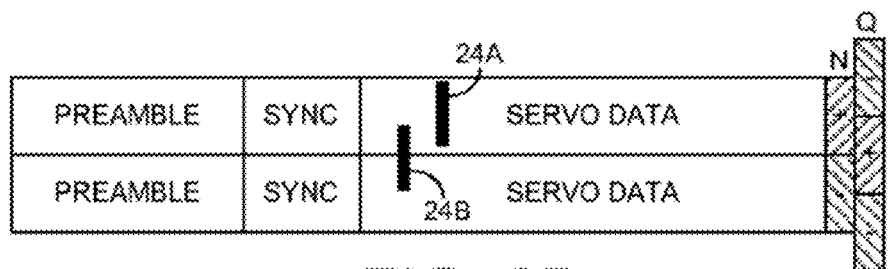
Figure 2C:
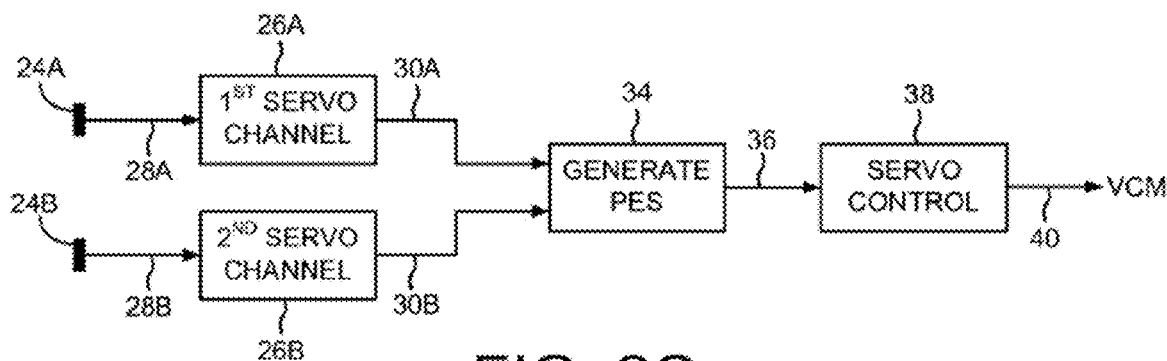

The servo bursts may comprise any suitable pattern, such as an amplitude-based servo pattern or a phase-based servo pattern, an example of which is shown in FIG. 2B.

In some configurations, each servo channel 26A and 26B in FIG. 2C generates position signals 30A and 30B based on reading the servo bursts in a conventional manner; that is, in the same manner as if the head 22 comprised a single read sensor. However, generating the PES based on two or more position signals generated using multiple read sensors may increase the accuracy of the PES, for example, by increasing the signal-to-noise ratio (SNR) and/or by reducing a repeatable runout (RRO) disturbance depending on neighboring track coherence. In another configuration, position signals 30A and 30B may be generated by servo channels 26A and 26B based on a track identifier (ID) in the servo sectors. That is, each servo channel may decode a detected track ID in order to improve the accuracy of the final detected track ID (e.g., by detecting and optionally correcting an error in one or both of the detected track IDs).

In the configuration of FIG. 2B, first and second read sensors 24A and 24B overlap in the cross-track direction such that in one embodiment both read sensors 24A and 24B may be used to demodulate a single servo track (e.g., the top servo track shown in FIG. 2B). However, the cross-track spacing between read sensors 24A and 24B still results in a different position signal 30A and 30B generated by each servo channel relative to the servo bursts. In some configurations, PES 36 may be generated relative to one of the read sensors (e.g., first read sensor 24A), and, therefore, the cross-track spacing between the read sensors 24A and 24B may be used to adjust second position signal 30B before being combined with first position signal 30A in order to generate PES 36. In some configurations, the cross track spacing between read sensors 24A and 24B may be large enough that each read sensor is positioned over a different servo track and therefore read a different track ID. In this case, the cross-track spacing may also be used to adjust the track ID of second position signal 30B before combining second position signal 30B with the first position signal 30A to generate PES 36.

Figure 3:
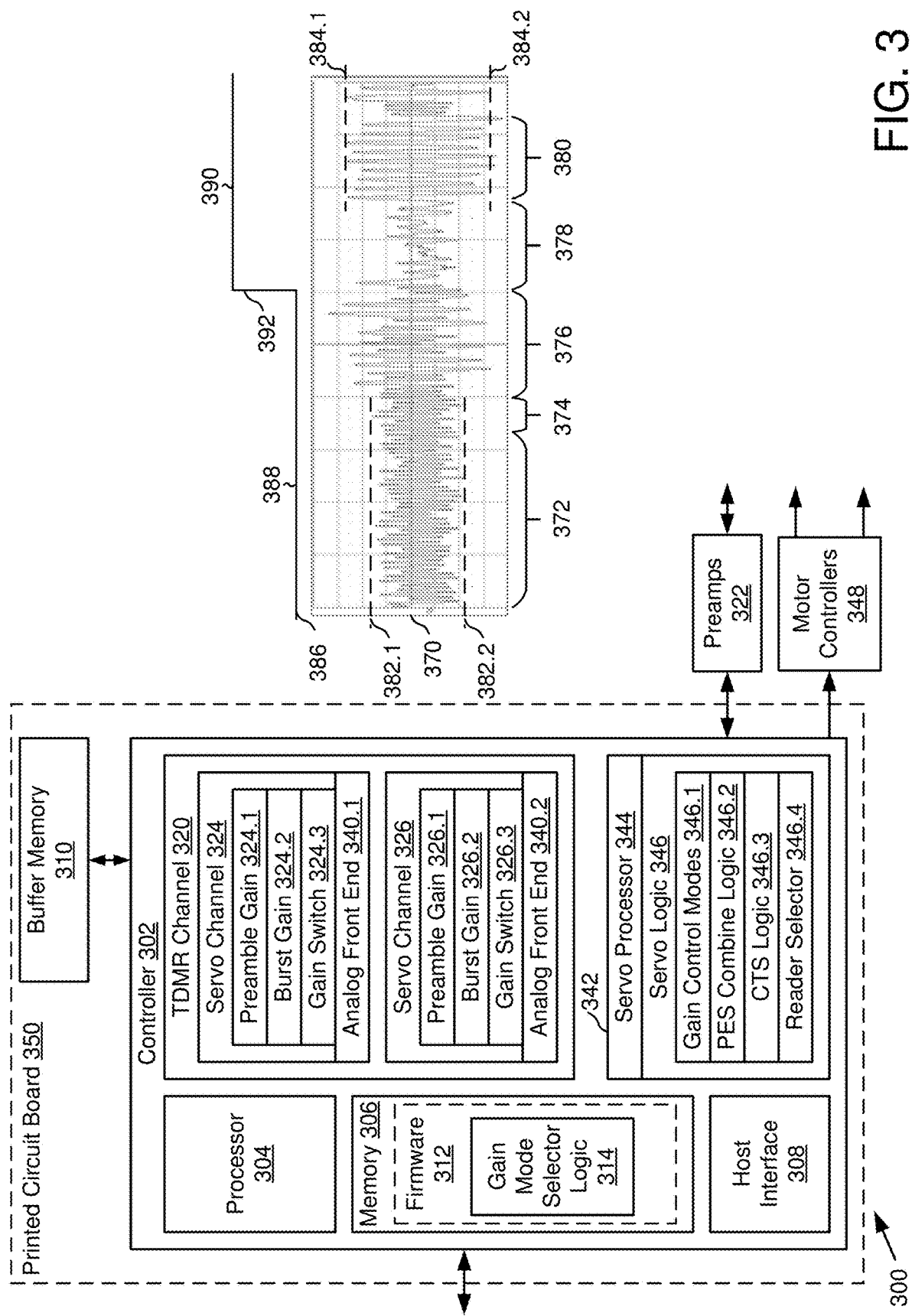
FIG. 3 is a block diagram of an example configuration of data storage device including control circuitry and servo sector read signal with dual channel burst gain switching.

FIG. 3 shows a portion of example control circuitry 300 and a storage medium 360 for a data storage device, such as a hard disk drive (HDD). In the example shown, control circuitry 300 may include one or more hardware controllers. Controller 302 may comprise a storage device controller configured to receive host storage commands, process storage operations for writing, reading, and managing data stored to non-volatile storage media in the disk drive, such as a magnetic media disk. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, two-dimensional magnetic recording (TDMR) channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Processor 304 may include any number of processors or processor cores configured to execute instructions alone or in combination to perform one or more functions described below. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or sub-modules for specific data storage device operations and processor 304 may execute those instructions, including controlling communication with other components, such as host interface 308, buffer memory 310, TDMR channel 320, and servo controller 342. In some configurations, controller firmware 312 may include some or all of one or more functions described with respect to host interface 308, TDMR channel 320, and/or servo controller 342

In some configurations, controller firmware 312 may include gain mode selector logic 314 configured to select among different gain modes for TDMR channel 320 and/or servo controller 342. For example, analog front ends 340.1 and 340.2 may include adjustable gain parameters for sampling analog read data signals during various operations, such as servo seek and track follow operations and/or data read/write operations. Gain control modes may be defined for different operations and may include not only gain parameters themselves, but also different configurations for utilizing the head and/or TDMR channel circuitry. In some configurations, gain parameters and modes may be managed for servo operations separately from data read/write operations. For example, servo controller 342 may include a plurality of gain control modes 346.1 that define a number of selectable gain control modes for servo operations and corresponding operating conditions for triggering those modes. In some configurations, gain control modes 346.1 may include: a fixed gain mode that uses the same gain value across the entire servo sector; a burst gain switching mode that defines different gain values for different portions of the servo sector and at least one gain switch position for moving between different gain values during the servo sector read operation; and a dual burst gain switching mode that operates multiple read channels in parallel to manage the use of different gain values for different portions of the servo sector read. In some configuration, gain mode selector logic 314 may use operating conditions of the storage device, such as seek, settle, or track follow modes, thermal fly height control (TFC) modes, heat-assisted magnetic recording (HAMR) modes, servo and/or data recovery modes, power modes, or other operating modes, to selectively determine which gain mode should be used. For example, dual burst gain switching mode may be selectively enabled during TFC on or TFC off modes to compensate for increased gain variation during different fly height modes and/or dual burst gain switching mode may be selectively disabled during power saving modes to reduce operating time using channels in parallel. The operation of gain mode selector logic 314, including both configuration and runtime logic, may be further described below with regard to FIG. 9.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

TDMR channel 320 may include one or more specialized circuits configured for processing binary data to be written to the disk surfaces using an analog write signal and processing the analog read signal from the disk surfaces back into binary data. TDMR channel 320 may also include circuits to enable the read/write channel to support reading and decoding servo pattern data from the disk surfaces and, in some configurations, support writing of servo patterns to the disk surfaces. For example, read/write channel 320 may include a write path comprised of various data scramblers, run-length limited (RLL) encoders, iterative error correction code (ECC) encoders, precompensation circuits, and other data or signal processing components. TDMR channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Similarly, the servo channel components may comprise a servo channel for reading servo patterns and, again, may share components with the read channel and/or write channel. TDMR channel 320 may provide the analog write signal to and receive the analog read signal from one or more preamplifier circuits (preamps) 322, which controls and amplifies signals to and from the heads. Binary data for recording to the storage medium may be received by TDMR channel 320 from controller firmware 312 and decoded data from TDMR channel 320 may be passed to controller firmware 312 and/or directed to buffer memory 310 for communication to the host.

TDMR channel 320 may be configured with at least two channel circuits that operate in parallel. This may include parallel write channels, parallel read channels, and parallel servo channels that may operate simultaneously based on read signals from multiple read elements on corresponding TDMR heads. The configuration shown in FIG. 3 depicts a pair of servo channel circuits 324 and 326. Servo channels 324 and 326 may include circuits to support reading servo data from servo sectors as the corresponding read elements for a selected head pass over those servo sectors during rotation of the storage medium and may support various servo operations, such as track seek, track follow, and other servo operations. Servo channels 324 and 326 may support operation of servo controller 342. For example, the read signals received through preamps 322 may be processed through servo channels 324 to provide servo read signals for determining position error signals to servo controller 342. Servo controller 342 may use the determined position error signal to generate motor control signals to motor controllers 348 based on the parallel servo read signals.

In some configurations, each channel in TDMR channel 320 may include an analog front end 340 configured to receive the analog read signals from preamps 322 and convert them into corresponding digital read signals for processing by other components of TDMR channel 320. For example, analog front ends 340.1 and 340.2 may each include an analog-digital converter (ADC), timing circuit, and one or more filters, equalizers, and/or other signal conditioning components for generating the digital read data. In order to generate digital samples from the analog read signals, ADCs in analog front end 340.1 and 340.2 may have adjustable gain control circuits for determining the gain values used by the ADC for any given set of samples or portion of a read signal, such as a servo sector.

In some configurations, servo channels 324 and 326 may be configured to vary the gain of their respective analog front ends 340.1 and 340.2 during servo read operations to switch gain values for higher accuracy sampling of different portions of the servo pattern in a servo sector. For example, read signal 370 shows the amplitude of read signals coming from a read element across a servo pattern in a servo sector. Various portions of the servo read signal correspond to different data and corresponding magnetic transitions written to the storage medium. For example, portion 372 may correspond to the preamble pattern used to locate the servo sector and initiate servo read gate; portion 374 may correspond to a synchronization mark used to establish timing and synchronization for the servo data to follow; portion 376 may correspond to servo data encoding a servo address mark, such as Gray code indicating the track identifier; portions 378 and 380 may correspond to burst patterns encoded on the medium surface for fine position to locate the track center. In some configurations, different portions of the servo pattern may have different maximum and/or average amplitudes, particularly during different operating conditions that impact the head-disk interface. For example, the initial portion of the servo pattern in read signal 370 includes lower amplitudes 382.1 and 382.2 relative to a later portion with higher amplitudes 384.1 and 384.2. Therefore, it may be advantageous to adjust the gain value being used to read a servo sector during the servo read operation. For example, the gain value 386 for sampling read signal 370 may be set to a first value 388 for a first portion of the servo sector and second value 390 for a second portion of the servo sector with a burst gain switching transition 392 between them. In some configurations, each servo channel 324 and 326 may include a preamble gain value 324.1 and 326.1 that provide an initial gain value for the servo sector read operation and a burst gain value 324.2 and 326.2 to provide a different gain value for reading the servo bursts at the end of the servo sector. In addition to these configurable values, a gain switch timing or transition value 324.3 and 326.3 may determine when during the servo read operation the gain value is switched between the values. When the gain is switched, the circuits may have a settle time to adjust to the new gain value and, during that settle time, sample values may be less reliable and more prone to error. Sampling during the settle time may adversely affect the reliability of those values for subsequent servo read signal decoding, which may have a particularly negative effect on decoding track address data, such as Gray code values. As discussed further below, different gain switch timing values 324.3 and 324.6 may be used for the separate servo channels to enable servo read operations through the dual servo channels to offset and compensate for errors induced by gain switching.

Servo controller 342 may include one or more specialized circuits configured to process servo data from the disk surfaces to determine position error signals and provide a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor circuit 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamps 322 and provided to servo controller 342 through channel 320. Servo controller 342 may provide servo control signals to motor controllers 348 and motor controllers 348 may control one or more actuator VCMs, microactuators, and/or a spindle motor for rotating the disk stack.

In some configurations, servo logic 346 may include logic for using servo read data signals from servo channels 324 and 326 in parallel to determine position error signals for servo control. More specifically, servo logic 346 may be configured to use gain control modes 346.1 and PES combine logic 346.2 to use digital signal values from two servo channels in parallel to determine track identifiers and a combined PES value that compensates for any errors that would otherwise affect the servo read from gain switching. Gain control modes 346.1 may include selectable modes for using gain control during servo operations. In some configurations, gain mode selector logic 314 may reside in controller firmware 312 to select among gain control modes 346.1 as described above. For example, depending on current operating conditions, servo logic 346 may be configured to use single gain values (no burst gain switching) and signals from one or both servo channels, burst gain switching with a single servo channel and acceptable error from gain switch settle time, or burst gain switching using dual servo channels to compensate for gain switch settle time. In some configurations, gain control modes 346.1 may include a set of gain control modes corresponding to the available hardware configurations in the heads and read paths. For example, different gain control modes may be used for heads with single read elements, dual read elements with fixed paths to corresponding servo channels, or read elements that may be selected and multiplexed to multiple read channels at the same time. PES combine logic 346.2 may complement PES control modes 346.1 by including logic for combining the digital read signals from dual servo channel modes in such a way that gain switch settle errors are reduced or eliminated. For example, in some configurations, the digital signal values from the two servo channels may be averaged to generate the PES, in some configurations, selected sets of digital signal values corresponding to the more reliable portions of each digital read signal may be combined, or in some configurations signal values from one portion of one reader may be used for one purpose (e.g., synchronization and/or address decoding) and another portion of the other reader may be used for another purpose (e.g., using burst values to generate PES relative to the identified track). Gain control modes 346.1 and PES combine logic 346.2 may be further described below with regard to FIGS. 4 and 5.

In some configurations, signals from multiple read elements in a head may be used for generating a combined track identifier and/or PES. As discussed elsewhere, these readers may not be directly aligned but subject to an offset in the cross-track direction. TDMR channel 320 may be calibrated for this cross-track spacing for use in data read/write, servo, and other operations. Servo logic 346 may include or interface with cross-track spacing (CTS) logic 346.4 to provide compensation for the cross-track spacing of each head and its respective readers. In some configurations, a CTS circuit may be calibrated in or accessed by TDMR channel 320 and/or servo logic 346 for providing the cross-track spacing compensation for CTS logic 346.3 to support PES combine logic 346.2 and assure that when digital signals are combined, their timing and relative locations are addressed.

In some configurations, head and channel circuitry may support multiplexing read signals from the read elements on a head to more than one channel. For example, when using burst gain switching with dual servo channels, reader selector 346.4 may select a preferred read element from the read elements on the head and multiplex the same analog read signal to both analog front end 340.1 and 340.2. Read selector 346.4 may include logic for determining the preferred read element on a head for a particular servo operation and generate a control signal for the read paths and corresponding switches for TDMR channel 520 to direct the analog read signal from the selected read element to both servo channels.

Figure 4:
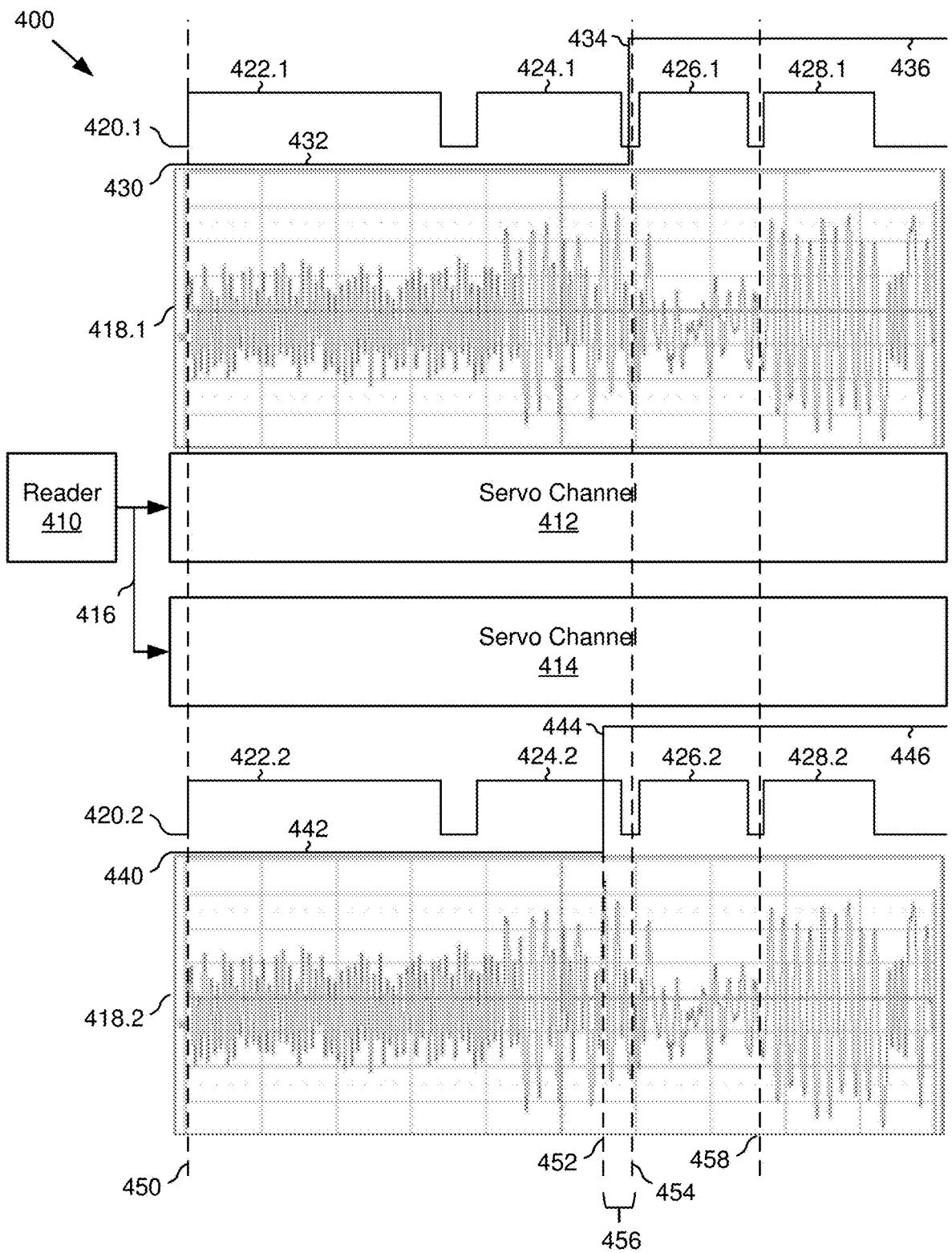
FIG. 4 is a diagram of an example of dual channel burst gain switching.

FIG. 4 shows an example configuration 400 for using burst gain switching with dual servo channels to reduce or avoid adverse effects from the settle time for switching gain values. In some configurations, control circuitry, such as control circuitry 300 in FIG. 3, may be used in conjunction with a read element on a read head that can be multiplexed to both channels in parallel to operate in the example configuration. Reader 410 may comprise a selected read element of a TDMR head or the single read element of a single-reader head that is electrically connected to dual servo channels 412 and 414, such as the parallel servo channels of a TDMR channel. In some configurations, read path circuitry 416 may include one or more switches and multiplexors capable of providing the same analog read signal in parallel from reader 410 to servo channels 412 and 414. Read path circuitry 416, which may include features of the corresponding analog front ends for servo channels 412 and 414, may include signal amplification, filtering, and/or conditioning circuits configured for impedance matching across the two read paths to provide read signals that are as close in timing, amplitude, and phase to one another as possible for both read channels.

Servo channels 412 and 414 may receive servo read signals 418.1 and 418.2 in parallel to determine servo positioning and PES. Servo channels 412 and 414 may operate with similar gate opening configurations 420.1 and 420.2 matched to the servo patterns of the servo sector and separating the read signal into functional sets of signal values or samples. For example, following an initial servo read gate 450, a preamble gate opening 422.1 and 422.2 samples signal values for the preamble; a servo data opening 424.1 and 424.2 samples signal values for the servo address mark or Gray code indicating the track identifier; a first burst gate opening 426.1 and 426.2 samples signal values for the P burst values; and a second burst gate opening 428.1 and 428.2 samples signal values for the Q burst values. The parallel signals may be synchronized to enable more effective selection and combination of signal values for decoding track identifiers and generating PES.

In some configurations, both servo channels 412 and 414 may implement burst gain switching and may use the same or similar gain values for the initial and later portions of the servo sector. The difference in operation of servo channels 412 and 414 may be the relative location of the gain switch. For example, servo channel 412 may use gain values 430 that include a first gain value 432 and a second gain value 436, with a gain switch transition 434 timed after the close of the servo data gate to assure that the switch does not negatively impact the Gray code signal values. This may improve the reliability of the servo data values and the servo controller may selectively use the signal values from servo channel 412 for servo track address identification. However, transition 434 may have a settle time that adversely affects the signal values for first burst gate opening 426.1.

Servo channel 414 may use gain values 440 that include a first gain value 442 and a second gain value 446, with a gain switch transition 444 timed before the close of servo data gate opening 424.2 and before first burst gain opening 426.2. The amount that transition 444 precedes burst gain opening 426.2 may be greater than the settle time of the gain electronics following the transition to assure that the burst signal values are not adversely affected by the transition. This may result in a position 456 in the signal values that is known to be less reliable in servo channel 414 that precedes a position 454 in servo channel 412 where transition 434 makes signal values less reliable from that channel. Servo channels 412 and 414 may be configured with a known offset value 456 between their respective burst gain switching transitions 434 and 444. In the example shown, these offset transitions impact the relative reliability of servo data signal values from servo channel 414 and the first burst values from servo channel 412. By the time both servo channels process the read signal for second burst gate openings 428.1 and 428.2 at position 458, both gain values have settled and the channels may be equally reliable.

The information regarding the timing of the different sets of signal values and their reliability relative to the offset gain switch transitions 434 and 444 may be used when the parallel read signals are subsequently combined for servo controller processing. In some configurations, portions of the read signal that are equally reliable may be averaged or otherwise combined across the two signals to provide combined signal values. For example, the signal values for the preamble and the second servo burst may have similar reliability across the two channels and the average of those corresponding values may be used by the servo channels or servo controller. In some configurations, portions of the read signal may be selectively used from the servo channel that provides more reliable values. For example, the servo data corresponding to the Gray code may be selected from servo channel 412 and the burst values for the first burst may selected from servo channel 414. The selected signal values from the corresponding windows may be used be corresponding functions in the servo channels and/or servo controller. For example, the Gray code data may be used to determine the track identifier and the burst values may be used to determine the PES relative to the identified track. In some configurations, PES detection uses the Gray code from servo channel 412 and the burst values (for both bursts) from servo channel 414. In some configurations, the signal values for the entire servo sector may be averaged for an improved signal. While not entirely eliminating the impact of the gain switching settle times, the offset gain switch transitions with non-overlapping settle times may result in more reliable data than from a single channel (or dual channels with the same transition points and corresponding settle times).

Figure 5:
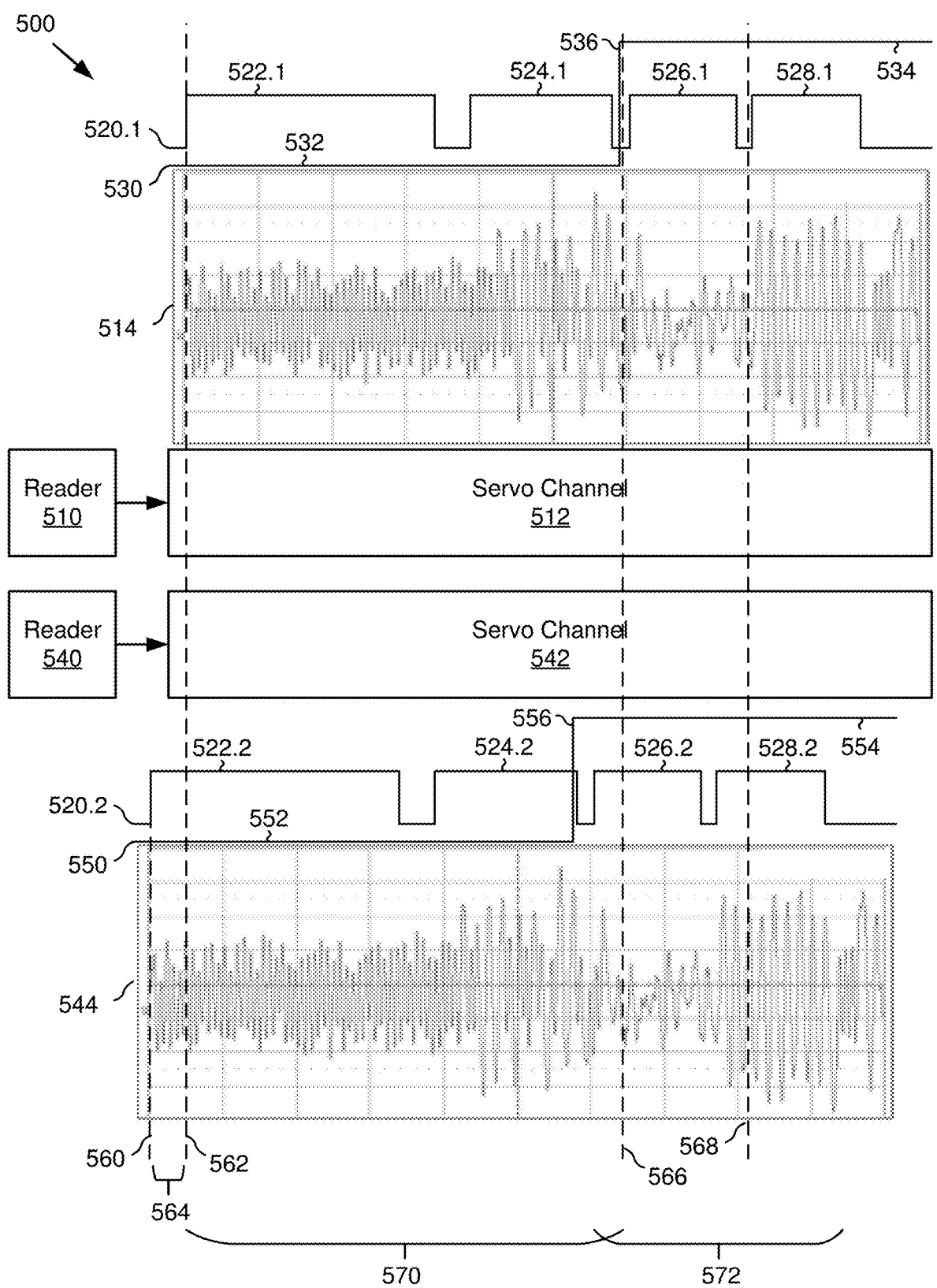
FIG. 5 is a diagram of another example of dual channel burst gain switching.

FIG. 5 shows another example configuration 500 for using burst gain switching with dual servo channels to reduce or avoid adverse effects from the settle time for switching gain values. In some configurations, control circuitry, such as control circuitry 300 in FIG. 3, may be used in conjunction with read elements on a read head that have fixed read paths to corresponding servo channels to operate in the example configuration. Readers 510 and 540 may comprise read element of a selected TDMR head that is electrically connected to dual servo channels 512 and 542, such as the parallel servo channels of a TDMR channel. As described above with regard to FIG. 4, servo channels 512 and 542 may operate with similar gate opening configurations 520.1 and 520.2 matched to the servo patterns of the servo sector and separating the read signal into functional sets of signal values or samples. For example, following their respective initial servo read gates 560 and 562, a preamble gate opening 522.1 and 522.2 samples signal values for the preamble; a servo data gate opening 524.1 and 524.2 samples signal values for the servo address mark or Gray code indicating the track identifier; a first burst gate opening 526.1 and 526.2 samples signal values for the P burst values; and a second burst gate opening 528.1 and 528.2 samples signal values for the Q burst values. The parallel signals are offset due to the relative positions of the read elements and when (and where) they pass over the same servo sector. There is an offset 564 between the timing of the parallel read signals for the same servo sector. Because the servo sector timing may be determined from the respective read gates, the corresponding signal values may be synchronized for subsequent processing and combination. Further, the cross-track offset between reader 510 and reader 540 may be compensated for by the CTS calibration that supports the TDMR channel.

Servo channels 512 and 542 may receive servo read signals 514 and 544 respectively. As shown in the example, servo read signal 544 may be received ahead of servo read signal 514 due to the relative positions on the read elements in the head in the down track direction and servo read gate 560 may trigger before servo read gate 562. In some configurations, both servo channels 512 and 542 may be configured for burst gain switching and, similar to FIG. 4, have their respective burst gain switch transitions offset. Gain values 530 for servo channel 512 may include a first gain value 532 and a second gain value 534, with a transition 536 timed after the servo data opening 524.1 to reliably capture the Gray code samples. The signal values between position 566 and position 568 may be less reliable due to the gain switch settle time and may be excluded from subsequent calculation of PES in favor of the burst values from servo channel 542. Gain values 550 for servo channel 542 may include a first gain value 552 and a second gain value 554, with a transition 556 timed before first burst gate opening 526.2 with sufficient margin to settle before first burst gate opening 526.2, which may compromise the servo data in servo data gate opening 524.2.

In some configurations, to combine the signals the servo data from servo channel 512 may be combined with the burst data from servo channel 542 to determine the PES. For example, the Gray code from servo channel 512 may be used to determine the track identifier and index a known cross-track separation (CTS) to use when calculating PES from servo channel 542. In some configurations, the first portion of the signal values 570 may be used from servo channel 512 based on first gain value 532 and combined with a second portion of signal values 572 from servo channel 542 based on second gain value 554. Signal values from both channels may be combined to determine the PES for the head.

Figure 6:
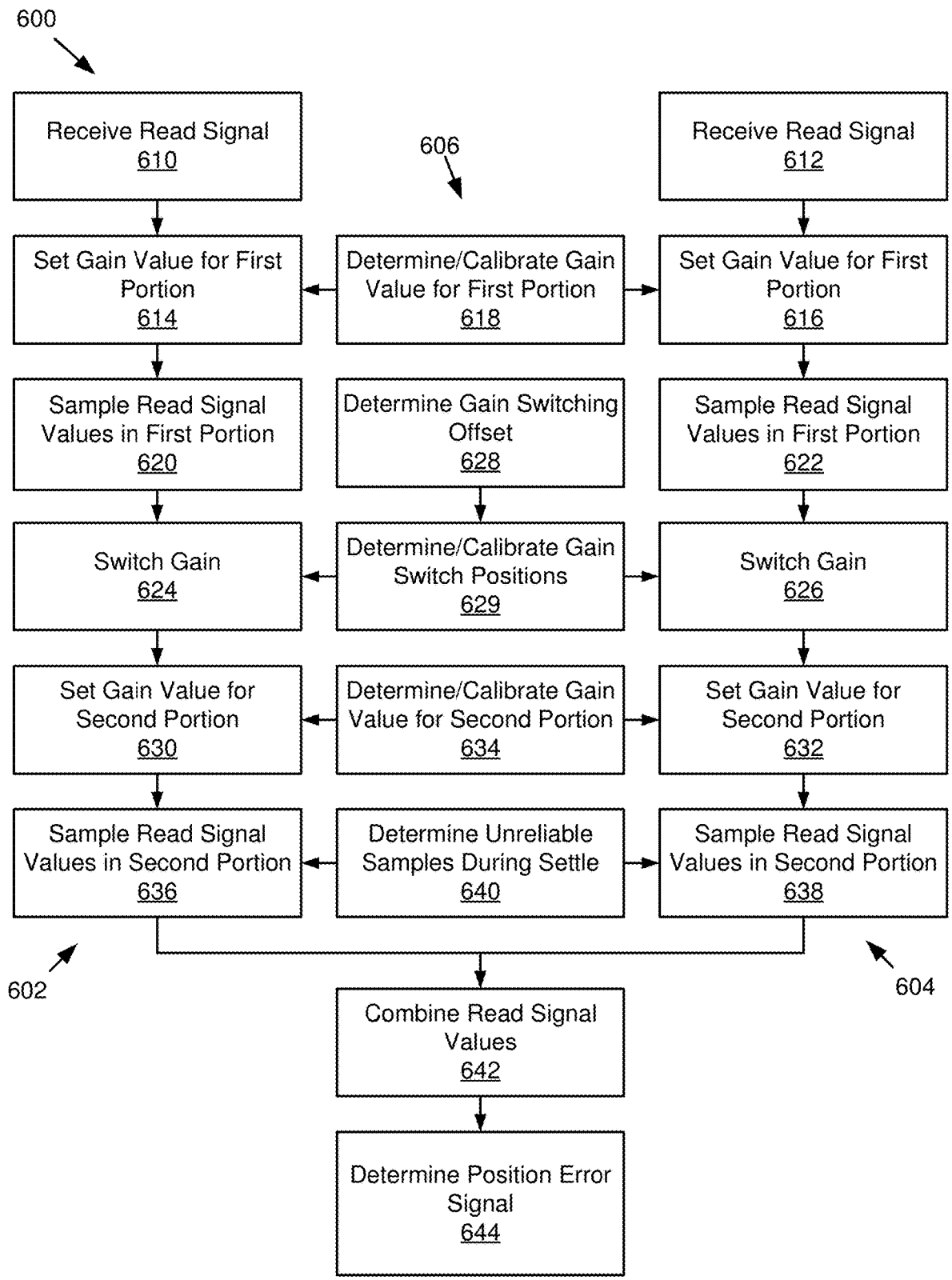
FIG. 6 is an example method of using dual channel burst gain switching for servo control.

As shown in FIG. 6, control circuitry 300 may be operated with a read head, according to an example method of using dual channel burst gain switching for servo control, i.e., according to the method 600 illustrated by blocks 610-644. In some configurations, blocks 602 may be executed by a first servo read channel and blocks 604 may be executed by a second servo read channel in parallel. In some configurations, blocks 606 may be executed by a servo controller in communication with the dual servo channels.

At blocks 610 and 612, read signals from the same head may be received by dual servo channels. For example, read signals from one or two read elements may be directed by read path circuitry to the dual channels of a TDMR channel.

At blocks 614 and 616, gain values may be set for the dual servo channels. For example, each servo channel may set its respective ADC gain value for a first portion of the read signal.

At block 618, gain values for a first portion of the servo sector may be determined or calibrated. For example, the servo controller may configure each servo channel with a gain value optimized for reading the preamble and servo data in the servo sector.

At blocks 620 and 622, read signal values may be sampled in a first portion of the analog read signal. For example, the ADC of each servo channel may use the first gain value to sample the analog read signal and determine corresponding digital read signal values.

At blocks 624 and 626, the gain may be switched for the dual servo channels. For example, the servo channels may be configured for burst gain switching at different transition positions in the servo sector.

At block 628, a gain switching offset may be determined. For example, the servo controller may configure the servo channels with different gain switch positions based on an offset that exceeds the settle time for the gain switching and assures that both servo channels are not settling at the same time. At block 629, gain switch positions may be determined. For example, the servo controller may set the switch position for one servo channel after the servo data to protect the servo track address data and set the switch position for the other servo channel in the servo data to protect the burst data.

At blocks 630 and 632, gain values may be set for second portions of the read signals. For example, the servo channels may set their respective ADC gain values with gain values that are different from the gain values used for the first portion.

At blocks 634, gain values for the second portion of the servo sector may be determined or calibrated. For example, the servo controller may configure each servo channel with a gain value optimized for reading the burst data in the servo sector.

At blocks 636 and 638, read signal values may be sampled in a second portion of the analog read signal. For example, the ADC of each servo channel may use the second gain value to sample the analog read signal and determine corresponding digital read signal values.

At block 640, unreliable samples during the respective settle times may be determined. For example, based on the gain switch positions and a maximum settle time, the servo controller may determine subsets of the samples from each channel likely to be adversely affected by the gain switching.

At block 642, read signal values may be combined. For example, the servo controller may combine the digital read signal values from the dual read channels in such a way that it avoids or otherwise compensates for the unreliable read signal values from each servo channel.

At block 644, a position error signal may be determined. For example, based on the combined digital read signals from the dual servo channels, the servo controller may determine a PES for the head and calculate appropriate servo control signals based on the PES.

Figure 7:
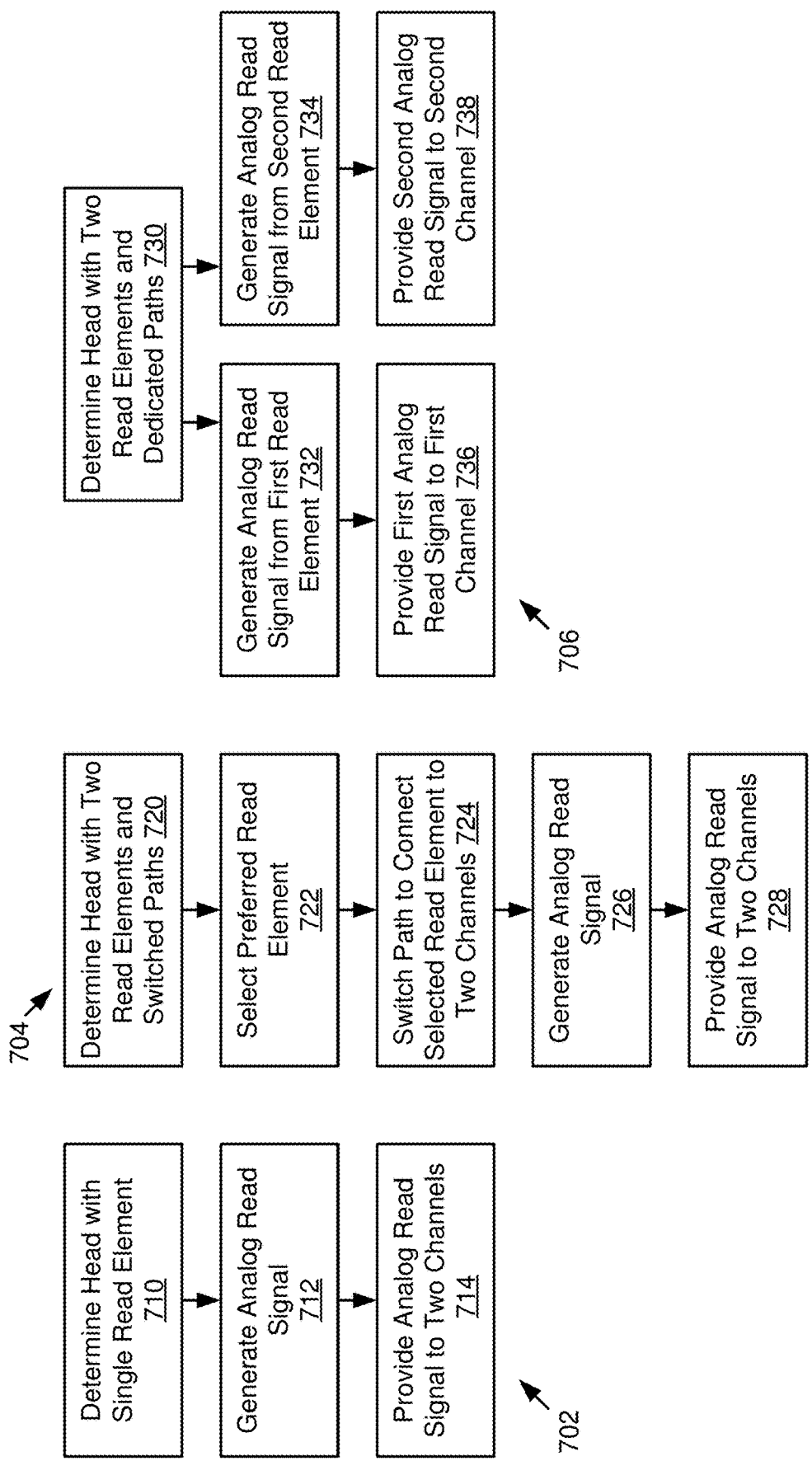
FIGS. 7A, 7B, and 7C are example methods of generating the read signals for dual burst gain switching based on head and channel circuit configurations.

As shown in FIGS. 7A-7C, control circuitry 300 may be operated with a read head according to example methods of generating the read signals for dual burst gain switching based on head and channel circuit configurations, i.e., according to the method 702 illustrated by blocks 710-714, method 704 illustrated by blocks 720-728, and method 706 illustrated by blocks 730-738.

At block 710, a head with a single read element may be determined. For example, the controller may determine that a selected head has only a single read element multiplexed to a TDMR channel.

At block 712, an analog read signal may be generated from the read element. For example, the single reader may generate an analog read signal as it passes over a servo sector during a servo operation.

At block 714, the analog read signal may be provided to two channels. For example, the read path circuitry may multiplex the analog read signal to provide it to both servo channels in a TDMR channel in parallel.

At block 720, a head with two read elements and switched paths may be determined. For example, the controller may determine that a selected head is a TDMR head with two or more read elements and includes a switched multiplexor to selectively connect read elements to the servo channels.

At block 722, a preferred read element may be determined. For example, the controller may select a read element from among the multiple read elements in the head with the best servo signal response.

At block 724, paths may be switched to connect the selected read element to two channels. For example, the controller may switch a multiplexor circuit between the read elements and the servo channels to electrically connect the selected read element to the analog front ends of two read channels in the TDMR channel.

At block 726, an analog read signal may be generated from the selected read element. For example, the selected reader may generate an analog read signal as it passes over a servo sector during a servo operation.

At block 728, the analog read signal may be provided to two channels. For example, the read path circuitry may multiplex the analog read signal to provide it to both servo channels in a TDMR channel in parallel.

At block 730, a head with a two read elements and dedicated paths to corresponding read channels may be determined. For example, the controller may determine that a selected head has only multiple read elements mapped by the read path circuitry to the servo channels in a TDMR channel.

At blocks 732 and 734, an analog read signal may be generated from each read element. For example, each reader may generate an analog read signal as it passes over a servo sector during a servo operation.

At block 736 and 738, the analog read signals may be provided to their respective channels. For example, the read path circuitry may send the analog read signal from one read element to one servo channel and the analog read signal from the other read element to the other servo channel in a TDMR channel in parallel.

Figure 8:
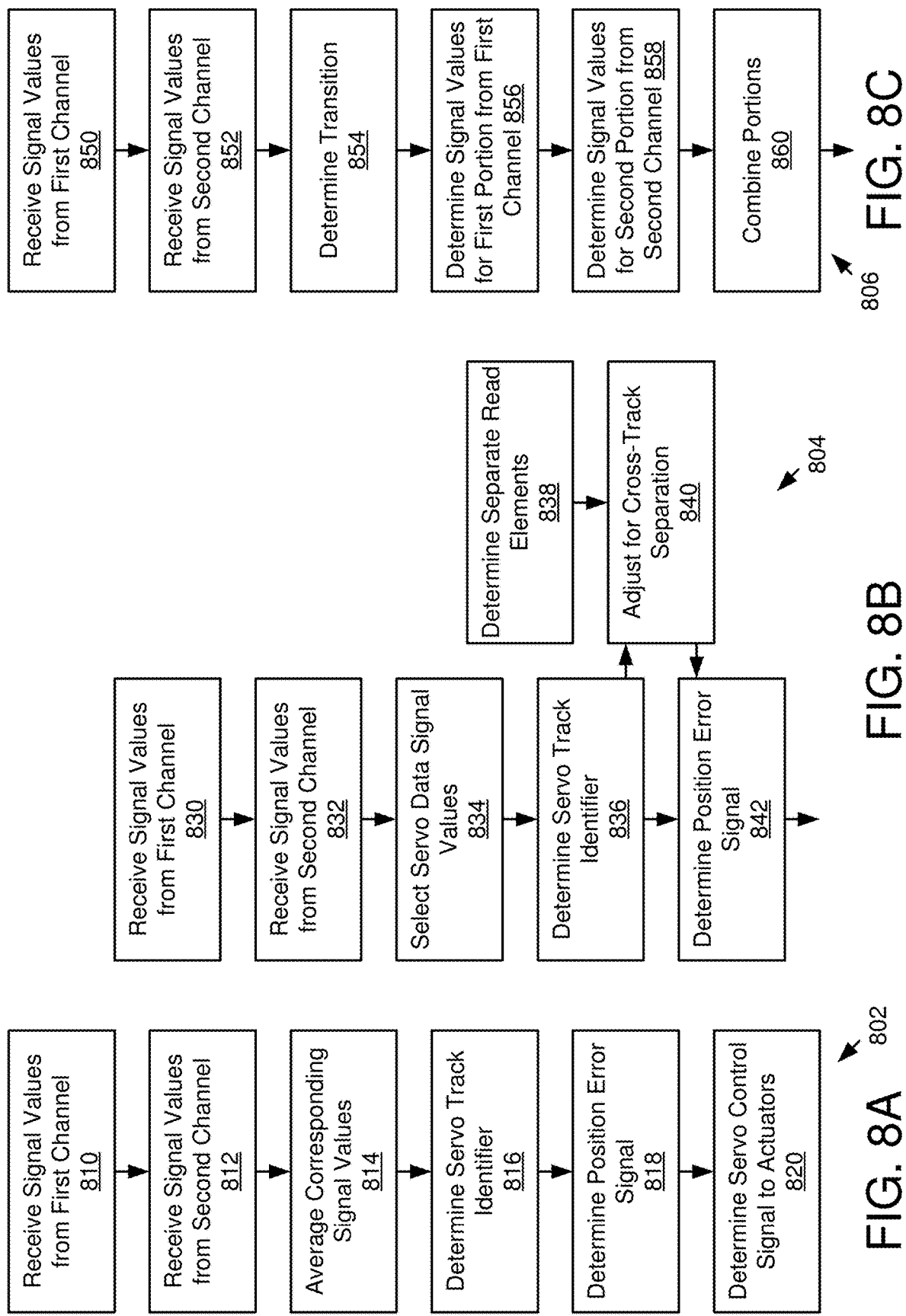
FIGS. 8A, 8B, and 8C are example methods of combining signal values from the dual servo read channels for servo control.

As shown in FIGS. 8A-8C, control circuitry 300 may be operated according to example methods of combining signal values from the dual servo read channels for servo control, i.e., according to the method 802 illustrated by blocks 810-820, method 804 illustrated by blocks 730-742, and method 806 illustrated by blocks 850-860.

At blocks 810 and 812, signal values may be received from a first servo channel and a second servo channel. For example, a servo controller may receive the digital read signal values from two servo channels in a TDMR channel in parallel.

At block 814, corresponding signal values may be averaged. For example, the servo controller may align and average the signal values for one or more portions of the servo sector to determine combined signal values.

At block 816, a servo track identifier may be determined. For example, the servo controller may use the servo data in the averaged signal values to determine the Gray code and corresponding servo track identifier.

At block 818, a position error signal may be determined. For example, the servo controller may use the burst values in the averaged signal values to determine offset from track center for the identified servo track and a corresponding position error signal.

At block 820, a servo control signal to one or more actuators may be determined. For example, the servo controller may use the position error signal to determine a corrective actuator control signal to a VCM and/or one or more microactuators to position the head.

At blocks 830 and 832, signal values may be received from a first servo channel and a second servo channel. For example, a servo controller may receive the digital read signal values from two servo channels in a TDMR channel in parallel.

At block 834, signal values for the servo data portion of the servo sector may be selected. For example, the servo controller may use the signal values from one of the servo channels configured to protect the servo data during servo burst gain switching to assure the best quality Gray code and highest likelihood of successfully decoding the servo track identifier.

At block 836, the servo track identifier may be determined. For example, the servo controller may use Gray code decoded from the signal values at block 834 to determine the servo track identifier.

At block 838, separate read elements may be determined. For example, the servo controller may determine that the signal values from the two servo channels correspond to different read elements on the head.

At block 840, signal values may be adjusted for cross-track separation. For example, the servo controller may access a CTS circuit calibrated for the relative head and read element positions to correct for the cross-track differences in the signal values from the two read elements and servo channels using previously determined cross-track separation values.

At block 842, a position error signal may be determined. For example, the servo controller may use burst values from both servo channels to determine offset from track center using the CTS adjusted values. The PES may then be used for servo control as described with regard to method 802.

At blocks 850 and 852, signal values may be received from a first servo channel and a second servo channel. For example, a servo controller may receive the digital read signal values from two servo channels in a TDMR channel in parallel.

At block 854, at least one transition may be determined. For example, the servo controller may use the relative positions of gain burst transitions and settle timing in the two channel configurations to determine the most reliable portions of each set of signal values.

At block 856, signal values for a first portion may be determined from the first channel. For example, the servo controller may select the set of signal values corresponding to the servo data where the servo gain transition for the first channel follows the servo data portion.

At block 858, signal values for a second portion may be determined from the second channel. For example, the servo controller may select the set of signal values corresponding to the burst data where the servo gain transition for the second channel is before the servo bursts with enough margin to assure they are out of range of the settle time.

At block 869, the portions may be combined. For example, the servo controller may combine the determined portions from the two servo channels to construct a more reliable set of servo sector data for determining the position error signal. Determining the position error signal and servo control signals may proceed as described for methods 802 and/or 804.

Figure 9:
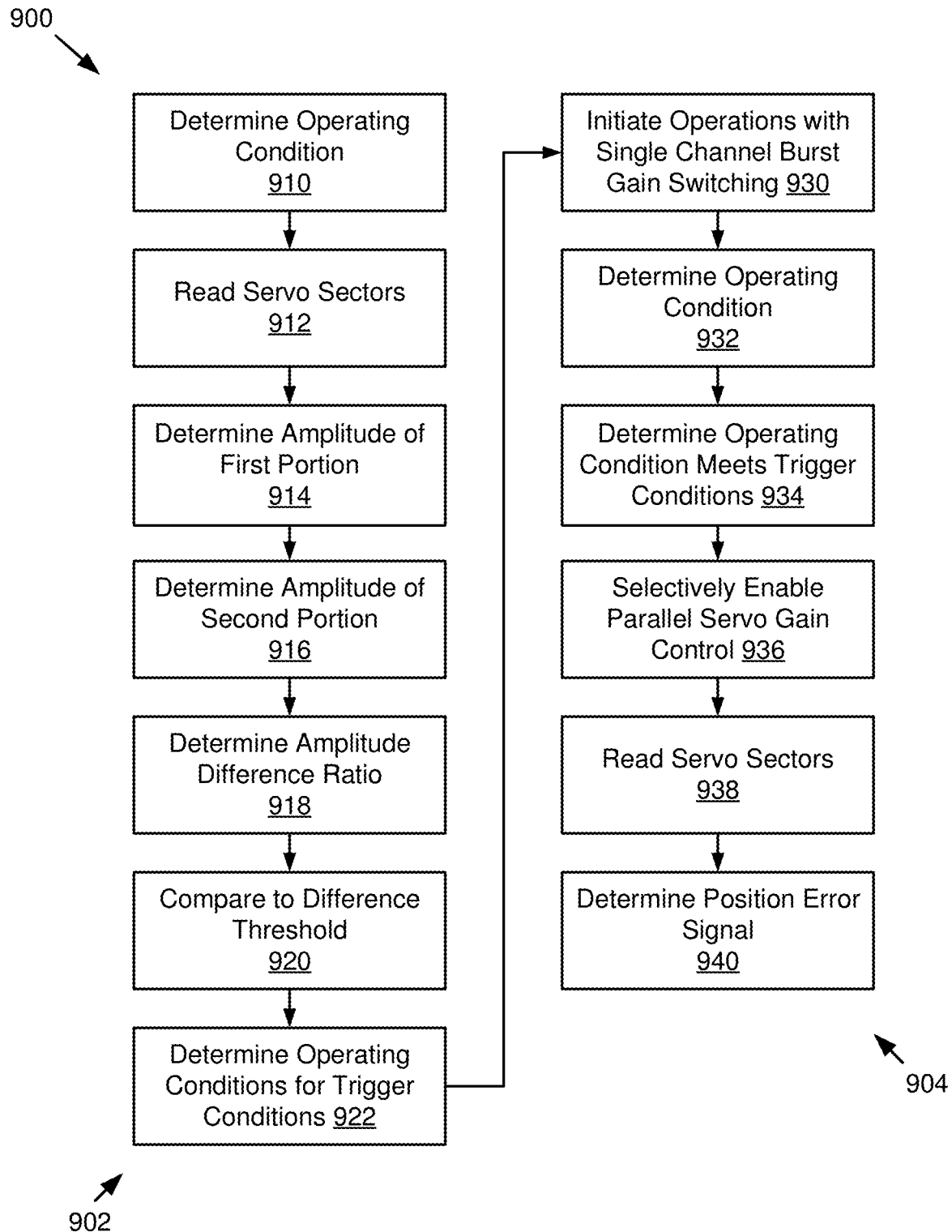
FIG. 9 is an example method of selectively using dual channel burst gain switching based on operating conditions.

As shown in FIG. 9, control circuitry 300 may be operated according to an example method of selectively using dual channel burst gain switching based on operating conditions, i.e., according to the method 900 illustrated by blocks 910-940. In some configurations, blocks 902 may be executed during configuration of a data storage device to determine trigger conditions for selecting among the gain switching modes. In some configurations, blocks 904 may be executed during operation of the data storage device to selectively change among gain switching modes.

At block 910, operating conditions may be determined. For example, a data storage device may be operated in a variety of operating conditions impacting the head/disk interface, such as various TFC and/or HAMR conditions, combined with various servo operations.

At block 912, servo sectors may be read during these operating conditions. For example, the servo controller and servo channels may read the servo sectors during the servo operations.

At block 914, an amplitude of a first portion of the servo sectors may be determined. For example, the servo controller may determine the amplitude of the preamble and servo data encoded in the servo sectors.

At block 916, an amplitude of a second portion of the servo sectors may be determined. For example, the servo controller may determine the amplitude of the servo burst portion of the servo sectors.

At block 918, an amplitude difference ratio may be determined. For example, a controller may calculate a difference between the maximum or average amplitudes of the first portion and the second portion under the various operating conditions being tested.

At block 920, the amplitude difference may be compared to a difference threshold. For example, the controller may include a difference threshold that determines when the amplitude difference between the two portions exceeds the capability of a single gain value for the ADC.

At block 922, operating conditions for triggering use of gain switching modes may be determined. For example, the controller may configure trigger conditions based on the operating conditions that resulted in amplitude differences meeting or exceeding the difference threshold in order to switch to one or more burst gain switching modes, including dual channel burst gain switching.

At block 930, operations may be initiated using single channel burst gain switching (or no burst gain switching). For example, during normal servo operations dual channel burst gain switching may not be necessary for servo performance and it may be preference to use only a single channel for power saving or other reasons.

At block 932, operating conditions may be determined. For example, the controller may monitor various operating conditions related to servo performance, TFC/HAMR conditions, temperature, power, etc.

At block 934, an operating condition meeting one or more trigger conditions may be determined. For example, the controller may determine that the current operating conditions of the data storage device meet one of the trigger conditions determined at block 922.

At block 934, parallel servo gain control may be enabled. For example, the controller may initiate use of dual servo channels for burst gain switching to improve servo read performance.

At block 936, servo sectors may be read with parallel servo gain control. For example, the controller may continue servo operations within the determined operating condition while using dual servo channels for burst gain switching.

At block 940, position error signals may be determined. For example, the servo controller may determine PES and servo control signals based on the servo read signals from dual servo channels with burst gain switching.

Technology for using dual servo channels to compensate for burst gain switching during servo sector read operations and position error signal calculation is described above. The different gain switching in the TDMR channel is a specific use case of the general concept of setting dissimilar channel parameters and selectively choosing channel outputs from the TDMR channel outputs to determine the head position in a more reliable manner. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:
1. A data storage device, comprising:
a first servo channel circuit configured to:
   receive a first read signal for a servo pattern from a servo sector; and
   determine, using a first gain value configured for reading a first portion of the servo pattern, signal values for the first portion of the servo pattern;
a second servo channel circuit configured to:
   receive a second read signal for the servo pattern from the servo sector; and
   determine, using a second gain value configured for reading a second portion of the servo pattern, signal values for the second portion of the servo pattern, wherein the first gain value and the second gain value are different; and a servo processor circuit configured to combine the signal values for the first portion and the signal values for the second portion to determine a position error signal of a head.

2. The data storage device of claim 1, further comprising:
a storage medium comprising a plurality of servo sectors defining a plurality of servo tracks, wherein the servo sector is from the plurality of servo sectors; and
the head actuated over the storage medium for reading the plurality of servo tracks, wherein:
the head comprises a read element;
the read element is configured to generate an analog read signal; and
the first read signal and the second read signal are based on the analog read signal.

3. The data storage device of claim 2, further comprising:
at least one switch between the read element and at least one channel circuit, wherein the at least one switch is configured to provide the analog read signal to the first servo channel circuit and to the second servo channel circuit in parallel with impedance matching.

4. The data storage device of claim 3, wherein:
the head comprises a plurality of read elements; and
the servo processor circuit is further configured to select the read element from the plurality of read elements in the head.

5. The data storage device of claim 1, further comprising:
a storage medium comprising a plurality of servo sectors defining a plurality of servo tracks, wherein the servo sector is from the plurality of servo sectors; and
the head actuated over the storage medium for reading the plurality of servo tracks, wherein the head comprises:
a first read element configured to:
generate a first analog read signal; and
provide the first analog read signal to the first servo channel circuit for the first read signal; and
a second read element configured to:
generate a second analog read signal; and
provide the second analog read signal to the second servo channel circuit for the second read signal.

6. The data storage device of claim 5, wherein:
the servo processor circuit is further configured to use a cross-track separation value to combine the signal values from the first portion and the second portion; and
the cross-track separation value is calibrated for relative positions of the first read element and the second read element.

7. The data storage device of claim 1, wherein:
the first portion comprises Gray code values corresponding to a servo address mark; and
the first gain value is calibrated to optimize Gray code detection.

8. The data storage device of claim 1, wherein:
the second portion comprises signal values for at least one fine positioning burst; and
the second gain value is calibrated to prevent saturation of the second servo channel circuit.

9. The data storage device of claim 1, wherein:
the second servo channel circuit is further configured to:
determine, using a third gain value, signal values for a first portion of the servo sector from the second read signal; and
switch from the third gain value to the second gain value responsive to a gain switch position in the second read signal; and
the gain switch position is calibrated to prevent a settle time for switching to the second gain value from affecting the signal values for the second portion of the servo sector from the second read signal.

10. A data storage device of claim 1, wherein the servo processor circuit is further configured to:
determine, based on an amplitude difference ratio for an operating condition, a trigger condition for using the first servo channel circuit and the second servo channel circuit in parallel for servo gain control; and
selectively enable, responsive to the trigger condition being met, the first servo channel circuit and the second servo channel circuit in parallel for servo gain control.

11. A method comprising:
receiving, by a first servo channel circuit, a first read signal for a servo pattern from a servo sector;
determining, by the first servo channel circuit and using a first gain value configured for reading a first portion of the servo pattern, signal values for the first portion of the servo pattern;
receiving, by a second servo channel circuit, a second read signal for the servo pattern from the servo sector;
determining, by the second servo channel circuit and using a second gain value configured for reading a second portion of the servo pattern, signal values for the second portion of the servo pattern, wherein the first gain value and the second gain value are different; and
combining the signal values for the first portion and the signal values for the second portion to determine a position error signal of a head.

12. The method of claim 11, further comprising:
generating, by a read element in the head, an analog read signal, wherein the first read signal and the second read signal are based on the analog read signal.

13. The method of claim 12, further comprising:
sending the analog read signal to the first servo channel circuit and the second servo channel circuit in parallel with impedance matching.

14. The method of claim 13, further comprising:
selecting, from a plurality of read elements in the head, the read element to send the analog read signal to the first servo channel circuit and the second servo channel circuit.

15. The method of claim 11, further comprising:
generating, by a first read element in the head, a first analog read signal;
providing the first analog read signal to the first servo channel circuit for the first read signal;
generating, by a second read element in the head, a second analog read signal; and
providing the second analog read signal to the second servo channel circuit for the second read signal.

16. The method of claim 15, further comprising:
using a cross-track separation value to combine the signal values from the first portion and the second portion, wherein the cross-track separation value is calibrated for relative positions of the first read element and the second read element.

17. The method of claim 11, wherein:
the first portion comprises Gray code values corresponding to a servo address mark; and
the first gain value is calibrated to optimize Gray code detection.

18. The method of claim 11, wherein:
the second portion comprises signal values for at least one fine positioning burst; and the second gain value is calibrated to prevent saturation of the second servo channel circuit.

19. The method of claim 11, further comprising:
determining, by the second servo channel circuit and using a third gain value, signal values for a first portion of the servo sector from the second read signal; and
switching, by the second servo channel circuit, from the third gain value to the second gain value responsive to a gain switch position in the second read signal, wherein the gain switch position is calibrated to prevent a settle time for switching to the second gain value from affecting the signal values for the second portion of the servo sector from the second read signal.

20. A data storage device comprising:
a first servo channel circuit comprising:
  means for receiving a first read signal for a servo pattern from a servo sector; and
  means for determining, using a first gain value configured for reading a first portion of the servo pattern, signal values for the first portion of the servo pattern;
a second servo channel circuit comprising:
  means for receiving a second read signal for the servo pattern from the servo sector; and
  means for determining, using a second gain value configured for reading a second portion of the servo pattern, signal values for the second portion of the servo pattern, wherein the first gain value and the second gain value are different; and
means for combining the signal values for the first portion and the signal values for the second portion to determine a position error signal of a head.

* * * * *